United States Patent
Zhang et al.

(10) Patent No.: US 10,887,774 B2
(45) Date of Patent: Jan. 5, 2021

(54) MOBILE COMMUNICATIONS SYSTEM EXPANSION METHOD AND DEVICE, STORAGE MEDIUM, AND PROGRAM PRODUCT

(71) Applicant: Huawei Technologies Co., Ltd., Shenzhen (CN)

(72) Inventors: Fan Zhang, Shenzhen (CN); Bo Bai, Hong Kong (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/862,104

(22) Filed: Apr. 29, 2020

(65) Prior Publication Data
US 2020/0260294 A1 Aug. 13, 2020

Related U.S. Application Data

(63) Continuation of application No. PCT/CN2018/111955, filed on Oct. 25, 2018.

(30) Foreign Application Priority Data

Oct. 31, 2017 (CN) .......................... 2017 1 1075641

(51) Int. Cl.
*H04W 40/00* (2009.01)
*H04W 16/18* (2009.01)
(Continued)

(52) U.S. Cl.
CPC ........... *H04W 16/18* (2013.01); *H04W 24/02* (2013.01); *H04W 24/08* (2013.01)

(58) Field of Classification Search
CPC ..... H04W 16/18; H04W 24/02; H04W 24/08; H04W 16/02; H04W 72/00
(Continued)

(56) References Cited

U.S. PATENT DOCUMENTS 8,060,017 B2 * 11/2011 Schlicht ................ H04L 1/0015
455/41.2
8,983,428 B2 * 3/2015 Iwamura ............... H04W 48/08
455/406

(Continued)

FOREIGN PATENT DOCUMENTS

| CN | 101651563 A | 2/2010 |
|---|---|---|
| CN | 102262678 A | 11/2011 |

(Continued)

*Primary Examiner* — Amancio Gonzalez
(74) *Attorney, Agent, or Firm* — Leydig, Voit & Mayer, Ltd.

(57) ABSTRACT

A mobile communications system expansion method, a related device, a storage medium, and a program product are provided, to relatively accurately expand a capacity of a current data service-focused communications network. In embodiments of this application, a distribution status of collected data characteristic information is fitted by using a power-law model, to obtain a user data transmission rate in a coverage area of a transmit unit; a theoretical quantity of users supported by a mobile communications system is determined based on the user data transmission rate and an obtained reference system transmission rate of the mobile communications system; and whether to expand a capacity of the transmit unit is determined based on the theoretical quantity of users and an actual quantity of users that access the transmit unit in the preset time segment.

20 Claims, 4 Drawing Sheets

(51) Int. Cl.
*H04W 24/02* (2009.01)
*H04W 24/08* (2009.01)

(58) Field of Classification Search
USPC ......................................................... 455/446
See application file for complete search history.

(56) References Cited

U.S. PATENT DOCUMENTS

2011/0058498 A1   3/2011   Miyoshi
2018/0262944 A1   9/2018   Li et al.

FOREIGN PATENT DOCUMENTS

| CN | 102355362 A | 2/2012 |
| CN | 105323770 A | 2/2016 |
| CN | 105407486 A | 3/2016 |
| CN | 106160993 A | 11/2016 |
| CN | 106507389 A | 3/2017 |
| CN | 106714233 A | 5/2017 |
| CN | 107148076 A | 9/2017 |
| WO | 2017067505 A1 | 4/2017 |

\* cited by examiner

MOBILE COMMUNICATIONS SYSTEM EXPANSION METHOD AND DEVICE, STORAGE MEDIUM, AND PROGRAM PRODUCT

CROSS-REFERENCE TO RELATED APPLICATIONS

This application is a continuation of International Application No. PCT/CN2018/111955, filed on Oct. 25, 2018, which claims priority to Chinese Patent Application No. 201711075641.3, filed on Oct. 31, 2017. The disclosures of the aforementioned applications are hereby incorporated by reference in their entireties.

TECHNICAL FIELD

Embodiments of this application relate to the communications field, and in particular, to a mobile communications system expansion method and device, a storage medium, and a program product.

BACKGROUND

Danish scientist Erlang proposed a traffic blocking theory 100 years ago. The theory is widely applied to voice network design and expansion. In a voice network, when a channel is fully occupied, a newly-arrived call is blocked or queued for access. In this case, a user that is being served by a system is not affected. Because the newly-arrived call is blocked or queued, a new user has poor experience. The model has been widely applied to a 2G network or a GSM network in the 1990s. Specifically, arrival of conventional voice services accords with a Poisson distribution, while duration of the services accords with an exponential distribution. Therefore, the model is used to resolve a 2G wireless network expansion problem. When a quantity of channels and a traffic blocking requirement are given, a maximum traffic volume that can be theoretically carried in a current network may be obtained by looking up an Erlang table. Whether capacity expansion needs to be performed is determined by comparing the value with a traffic volume in an actual network. If the found maximum traffic volume is greater than a traffic volume in an existing network, no capacity expansion is required. On the contrary, capacity expansion needs to be performed.

With coming of the LTE era and the future 5G era, data networks are rapidly deployed. Furthermore, user behavior greatly changes, with its focus changing from conventional voice services to applications such as social communication and videos. It is more difficult to measure a system capacity due to explosive growth in data services and unpredictable hotspots. An "average effect" is usually presented in the conventional voice network. For example, an explosive growth phenomenon scarcely occurs in a voice request arrival process. Further, a long-duration call phenomenon also scarcely occurs for call duration. In a data service network, because randomness of users and differentiation between the users, data services have especially obvious unexpected growth characteristics. In addition, it is found, through analysis of data actually measured in the existing network, that quantities of arrived data services no longer accord with the Poisson distribution, and service lengths no longer accord with the exponential distribution. If the traffic blocking theory is still applied to perform capacity expansion, an inaccuracy problem arises.

In conclusion, a mobile communications system expansion solution is urgently needed, to relatively accurately expand a capacity of a current data service-focused communications network.

SUMMARY

Embodiments of this application provide a mobile communications system expansion method, a related device, a storage medium, and a program product, to relatively accurately expand a capacity of a current data service-focused communications network.

According to a first aspect, an embodiment of this application provides a mobile communications system expansion method. In the method, a mobile communications system expansion device collects data characteristic information in a coverage area of a transmit unit in at least one preset time segment, where the data characteristic information includes a quantity of data packets and lengths of the data packets; fits a distribution status of the data characteristic information by using a power-law model, to obtain a user data transmission rate in the coverage area of the transmit unit; determines, based on the user data transmission rate and an obtained reference system transmission rate of a mobile communications system, a theoretical quantity of users supported by the mobile communications system; and determines, based on the theoretical quantity of users and an actual quantity of users that access the transmit unit in the preset time segment, whether to expand a capacity of the transmit unit. A distribution of a quantity of arrived data packets of a data service and a distribution of lengths of the data packets accord with the power-law model. Therefore, whether a capacity of a current data service-focused communications network needs to be expanded can be determined more accurately by fitting the distribution status of the data characteristic information by using the power-law model.

In a possible design, before determining, based on the user data transmission rate and the obtained reference system transmission rate of the mobile communications system, the theoretical quantity of users supported by the mobile communications system, the expansion device may further obtain a to-be-satisfied latency satisfaction degree, where the latency satisfaction degree is used to indicate a probability that a length of a time segment from a time point at which data enters the transmit unit to a time point at which the data leaves the transmit unit is not greater than a time length threshold; and determine, based on a quantity of reference users and a reference user data transmission rate that are supported by the mobile communications system and the latency satisfaction degree, the reference system transmission rate of the mobile communications system when the latency satisfaction degree and the reference user data transmission rate are satisfied. In this embodiment of this application, the latency satisfaction degree is used to indicate the probability that the length of the time segment from the time point at which the data enters the transmit unit to the time point at which the data leaves the transmit unit is not greater than the time length threshold. Therefore, the latency satisfaction degree can be considered as a user experience indicator. To be specific, the latency satisfaction degree can better reflect user experience of a terminal device. In this way, whether to expand the capacity of the transmit unit is determined based on the latency satisfaction degree, and data service network planning can be better guided from a perspective of user experience of the terminal device, thereby providing a better service for a user.

In a possible design, the power-law model includes a zeta model and a Pareto model. The expansion device fits a distribution status of the quantity of data packets by using the zeta model, to determine a zeta model parameter; fits a distribution status of the lengths of the data packets by using the Pareto model, to determine a Pareto model parameter; and determines the user data transmission rate in the coverage area of the transmit unit based on the zeta model parameter and the Pareto model parameter. The zeta model is used to fit the distribution status of the quantity of data packets, and the Pareto model is used to fit the distribution status of the lengths of the data packets. Therefore, a distribution status of data services of users can be more accurately fitted by using the zeta model and the Pareto model, thereby providing a more accurate capacity expansion decision. For formulas of the zeta model and the Pareto model, refer to content in subsequent embodiments.

In a possible design, the expansion device may determine a quantity of equivalent channels based on a physical layer transmission rate and the reference user data transmission rate that are supported by the mobile communications system; look up a preset capacity expansion calculation table based on the quantity of equivalent channels and the latency satisfaction degree, to obtain the quantity of reference users, where the capacity expansion calculation table includes an association relationship between the quantity of equivalent channel, the latency satisfaction degree, and the quantity of reference users under a condition that the reference user data transmission rate and preset latency duration are satisfied; and calculate, based on the quantity of reference users and the reference user data transmission rate, the reference system transmission rate of the mobile communications system when the latency satisfaction degree and the reference user data transmission rate are satisfied. Because the capacity expansion calculation table may be set, a more accurate reference system transmission rate is determined based on the capacity expansion calculation table and the quantity of equivalent channels, thereby providing support for further determining whether to expand the capacity. In addition, the manner of looking up the capacity expansion calculation table can simplify the solution, so that a more complex function calculation process can be avoided, and a running speed of the solution can be further increased. Moreover, in this embodiment of this application, the capacity expansion calculation table is similar to an Erlang table (for example, an Erlang B table and/or an Erlang C table). Therefore, the capacity expansion calculation table can be more easily promoted. For a solution for constructing the capacity expansion calculation table, refer to content in subsequent embodiments. Details are not described herein.

In a possible design, the transmit unit is an RRU, and the expansion device is a BBU module. Optionally, if the theoretical quantity of users is greater than the actual quantity of users, the BBU module increases physical resource block PRB resources by a first quantity for the RRU. Optionally, if the theoretical quantity of users is less than the actual quantity of users, the BBU module decreases PRB resources by a second quantity for the RRU. In this way, a resource can be allocated to the RRU from a perspective of user experience.

In a possible design, the first quantity and the second quantity may be determined based on a transmission rate on a PRB resource, the user data transmission rate, the theoretical quantity of users, and the actual quantity of users.

According to a second aspect, an embodiment of this application provides a mobile communications system expansion device. The mobile communications system expansion device has a function of implementing behavior of the expansion device in the method example according to the first aspect. The function may be implemented by using hardware. A structure of the mobile communications system expansion device includes a communications module, a processor, a bus, and a memory. The processor and the memory are connected by using the bus.

In a possible design, the memory is configured to store an instruction; and the processor is configured to execute the instruction stored in the memory, and when the processor executes the instruction stored in the memory, the mobile communications system expansion device is configured to perform the method according to any one of the first aspect or the possible designs of the first aspect.

In a possible design, the communications module may be a radio frequency (RF) circuit, a wireless high-fidelity (wireless fidelity, Wi-Fi) module, a communications interface, a Bluetooth module, or the like.

According to a third aspect, an embodiment of this application further provides a mobile communications system expansion device. The mobile communications system expansion device has a function of implementing behavior of the expansion device in the method example according to the first aspect. The function may be implemented by using hardware, or may be implemented by hardware executing corresponding software. The hardware or the software includes one or more modules corresponding to the foregoing function.

In a possible design, a structure of the mobile communications system expansion device includes an obtaining unit and a processing unit. These units can perform corresponding functions in the method example. For details, refer to detailed descriptions in the method example. The details are not described herein again.

According to a fourth aspect, an embodiment of this application provides a computer storage medium. The computer storage medium stores an instruction, and when run on a computer, the instruction enables the computer to perform the method according to any one of the first aspect or the possible implementations of the first aspect.

According to a fifth aspect, an embodiment of this application provides a computer program product including an instruction. When run on a computer, the computer program product enables the computer to perform the method according to any one of the first aspect or the possible implementations of the first aspect.

DESCRIPTION OF EMBODIMENTS

Figure 1:
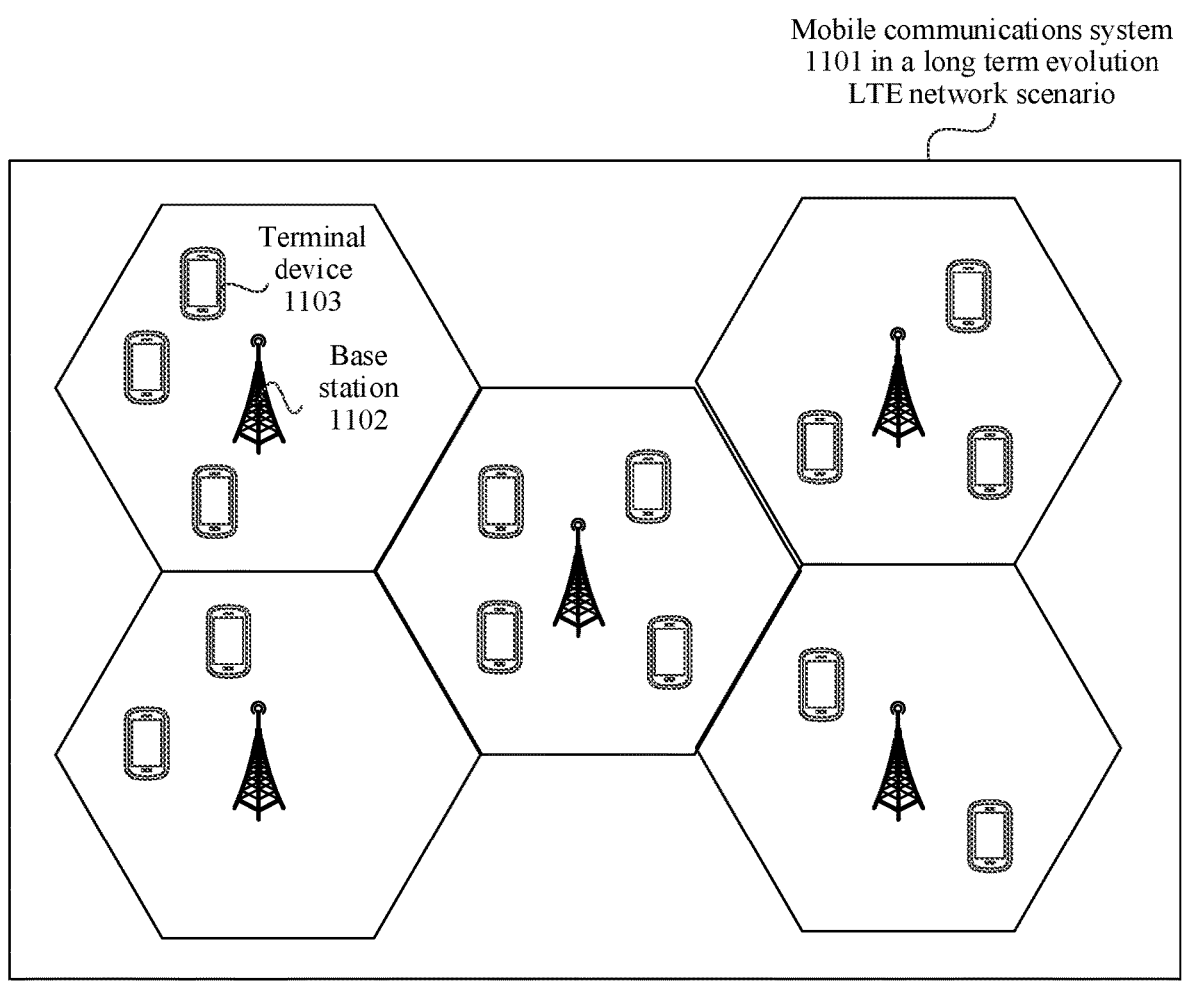
FIG. 1 is a schematic architectural diagram of a mobile communications system, to which the embodiments of this application are applied, in a 4G LTE network scenario.

The embodiments of this application are applicable to a plurality of mobile communications systems such as 4G and 5G communications systems. FIG. 1 is an example schematic architectural diagram of a mobile communications system, to which the embodiments of this application are applied, in a 4G long term evolution (LTE) network scenario. As shown in FIG. 1, the mobile communications system 1101 in the LTE network scenario may include a plurality of base stations 1102 and a plurality of terminal devices 1103. In the LTE network scenario, each base station may independently perform functions such as network organization, resource allocation, and signal processing. In the LTE network scenario, a transmit unit in this embodiment of this application may be a base station, and an expansion device configured to perform a mobile communications network expansion method in an embodiment of this application may also be deployed on the base station. The mobile communications system expansion method provided in the embodiment of this application may be used to determine whether a capacity of the base station needs to be expanded. In an optional implementation solution, if the capacity of the base station needs to be expanded, an engineer may manually expand the capacity of the base station whose capacity needs to be expanded, for example, add a usable frequency band for the base station whose capacity needs to be expanded.

Figure 2:
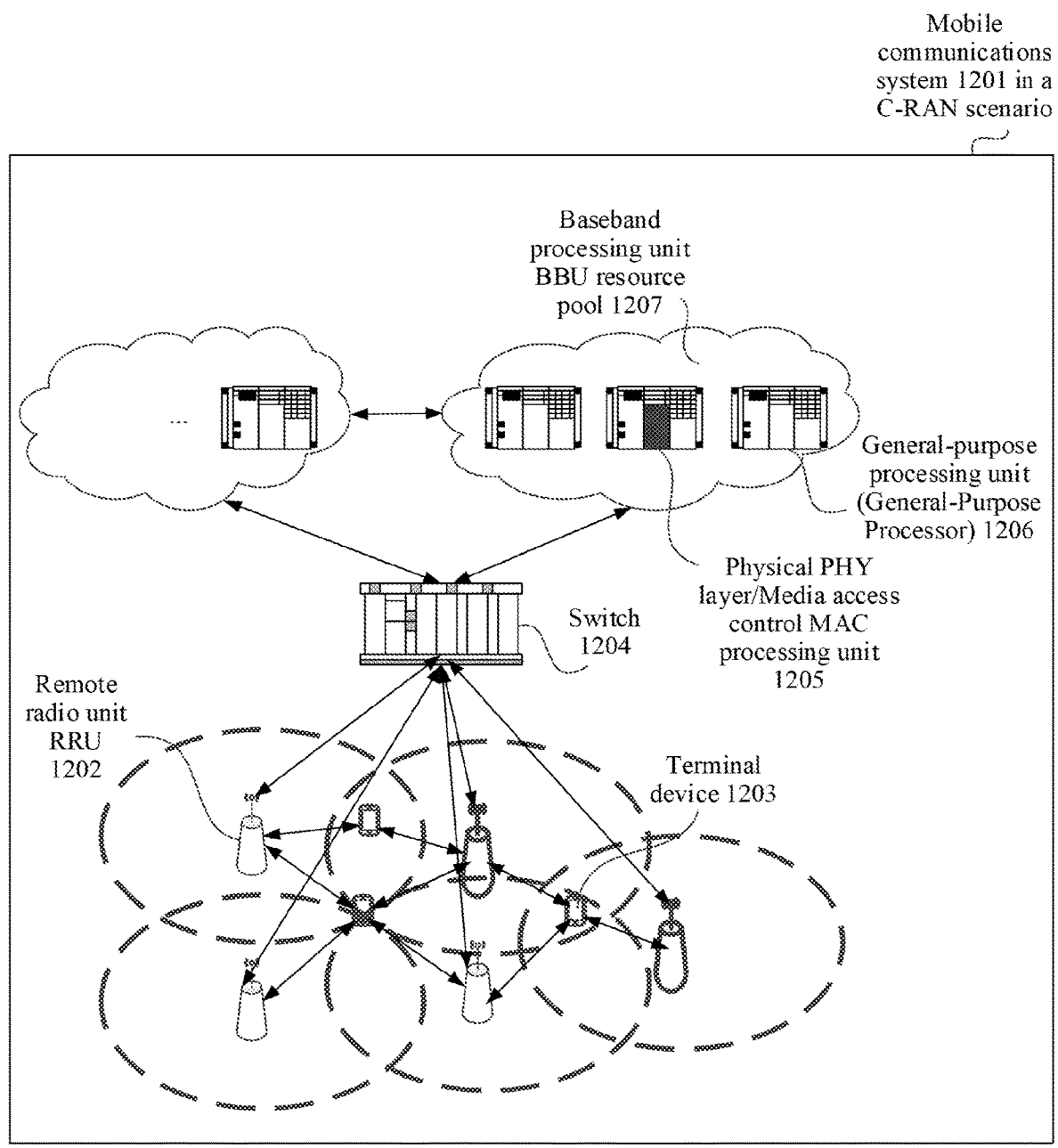
FIG. 2 is a schematic architectural diagram of a mobile communications system, to which the embodiments of this application are applied, in a 5G C-RAN scenario.

FIG. 2 is an example schematic architectural diagram of a mobile communications system, to which the embodiments of this application are applied, in a 5G C-RAN scenario. A C-RAN is a clean radio access network architecture (Clean system) based on centralized processing, collaborative radio, and real-time cloud infrastructure. As shown in FIG. 2, the mobile communications system 1201 in the C-RAN scenario may include a remote radio frequency module (Remote Radio Unit, RRU) 1202, a terminal device 1203, a switch 1204, a baseband processing unit (BBU) resource pool 1207. The BBU resource pool 1207 may also be referred to as a virtual base station pool. The BBU resource pool 1207 may include a plurality of processing units such as a general-purpose processing unit 1206 and a physical (PHY) layer/media access control (MAC) processing unit 1205, where "/" in the PHY/MAC processing unit 1205 may mean and.

In a C-RAN architecture, the BBU resource pool 1207 may perform functions such as network organization, resource allocation, and baseband signal processing. For example, the MAC processing unit 1205 and the general-purpose processing unit 1206 may implement the functions such as network organization, resource allocation, and baseband signal processing. A large quantity of RRUs 1202 may be connected to the BBU resource pool 1207 by using a large-capacity fiber backhaul network. One or more switches 1204 may be disposed between the RRUs 1202 and the BBU resource pool 1207. The RRU 1202 may include only a radio frequency unit, to receive and send uplink and downlink radio frequency signals. The terminal device 1203 may access a network by using the RRU 1202 according to a newly-defined physical layer technology.

In the C-RAN scenario, a transmit unit in this embodiment of this application may be an RRU, and an expansion device configured to perform a mobile communications network expansion method in an embodiment of this application may also be referred to as a BBU module. The BBU module in this embodiment of this application may be the BBU resource pool 1207, or may be a module deployed in the BBU resource pool 1207. For example, the BBU module may be a module including the PHY/MAC processing unit 1205 and the general-purpose processing unit 1206. In the C-RAN scenario, the mobile communications system expansion solution provided in the embodiment of this application may be used to determine whether a capacity of the RRU needs to be expanded. In an optional implementation solution, if the capacity of the RRU needs to be expanded, the BBU module may expand the capacity of the RRU whose capacity needs to be expanded.

In the C-RAN scenario, in an optional implementation solution, adjacent RRUs cannot use a same physical resource block (PRB) resource due to strong signal interference. In this case, the BBU module needs to allocate an exclusive orthogonal PRB resource to each RRU. The BBU module may determine, by using the mobile communications system expansion solution provided in the embodiment of this application, whether to expand the capacity of the RRU. If the capacity of the RRU needs to be expanded, PRB resources may be increased for the RRU. If the capacity of the RRU does not need to be expanded, PRB resources may not need to be increased for the RRU. Further, if the capacity of the RRU does not need to be expanded, PRB resources may be decreased for the RRU. In this way, the BBU module may configure PRB resources for several adjacent RRUs that have strong interference relationships.

The terminal device in this embodiment of this application may communicate with one or more core networks by using a radio access network (RAN) and the like. The terminal device may be user equipment (UE), an access terminal device, a subscriber unit, a subscriber station, a mobile station, a mobile console, a remote station, a remote terminal device, a mobile device, a user terminal device, a terminal device, a wireless communications device, a user agent, or a user apparatus. The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or the like.

Figure 3:
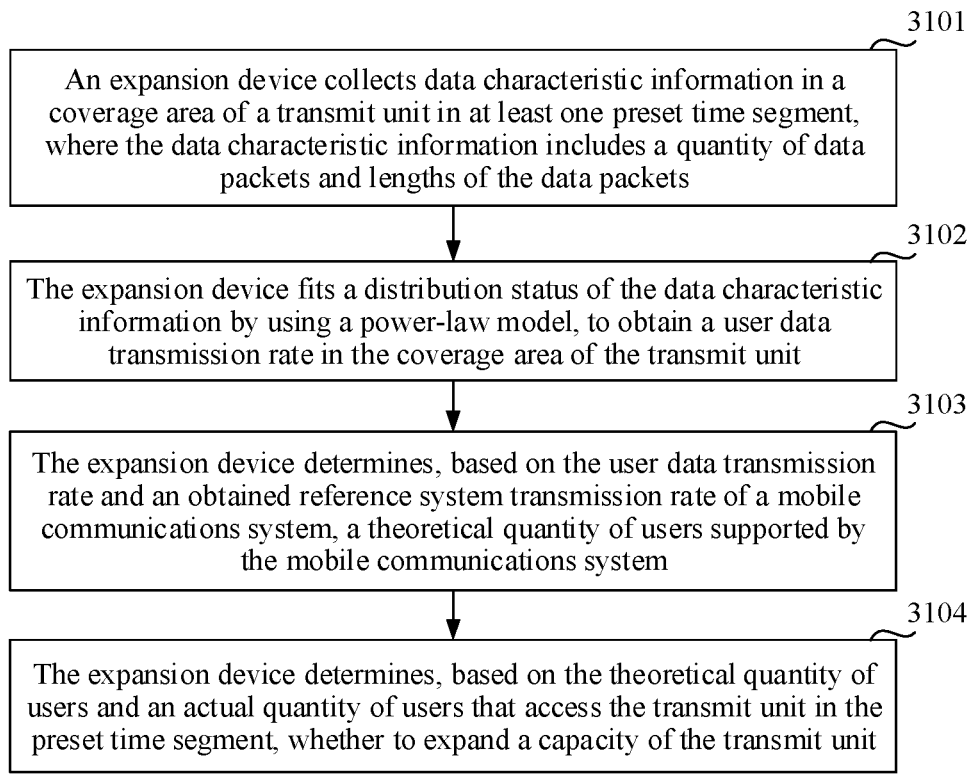
FIG. 3 is a schematic flowchart of a mobile communications system expansion method according to an embodiment of this application.

FIG. 3 is an example schematic flowchart of a mobile communications system expansion method according to an embodiment of this application. The method may be performed by an expansion device. The expansion device may be integrated into a base station 1102 in FIG. 1, or may be deployed in the BBU resource pool 1207 in FIG. 2. As shown in FIG. 3, the method includes the following steps:

Step 3101: The expansion device collects data characteristic information in a coverage area of a transmit unit in at least one preset time segment, where the data characteristic information includes a quantity of data packets and lengths of the data packets. A length of a data packet may be represented by a quantity of bytes occupied by the data packet. For example, a larger quantity of bytes occupied by a data packet indicates a longer length of the data packet, and a smaller quantity of bytes occupied by a data packet indicates a shorter length of the data packet.

Step 3102: The expansion device fits a distribution status of the data characteristic information by using a power-law model, to obtain a user data transmission rate in the coverage area of the transmit unit. Optionally, for example, the power-law model may be any one or more of a zeta model, a Pareto model, a Cauchy model, a Zipf model, a Levy model, and the like. Optionally, in this embodiment of this application, the distribution status of the data characteristic information may be fitted by using a combination of the power-law model and another model. For example, the distribution status of the data characteristic information is fitted by using a Poisson distribution and the zeta model.

Step 3103: The expansion device determines, based on the user data transmission rate and an obtained reference system transmission rate of a mobile communications system, a theoretical quantity of users supported by the mobile communications system.

Step 3104: The expansion device determines, based on the theoretical quantity of users and an actual quantity of users that access the transmit unit in the preset time segment, whether to expand a capacity of the transmit unit.

In this embodiment of this application, the data characteristic information in the coverage area of the transmit unit is collected in the at least one preset time segment, where the data characteristic information includes the quantity of data packets and the lengths of the data packets; the distribution status of the data characteristic information is fitted by using the power-law model, to obtain the user data transmission rate in the coverage area of the transmit unit; the theoretical quantity of users supported by the mobile communications system is determined based on the user data transmission rate and the obtained reference system transmission rate of the mobile communications system; and whether to expand the capacity of the transmit unit is determined based on the theoretical quantity of users and the actual quantity of users that access the transmit unit in the preset time segment. It is found, by sampling and researching on a data service, that a distribution of a quantity of arrived data packets of the data service and a distribution of lengths of the data packets accord with the power-law model. Therefore, in this embodiment of this application, whether a capacity of a current data service-focused communications network needs to be expanded can be determined more accurately by fitting the distribution status of the data characteristic information by using the power-law model.

Further, before step 3103, the expansion device may further obtain a to-be-satisfied latency satisfaction degree, and determine, based on a quantity of reference users and a reference user data transmission rate that are supported by the mobile communications system and the latency satisfaction degree, the reference system transmission rate of the mobile communications system when the latency satisfaction degree and the reference user data transmission rate are satisfied. The latency satisfaction degree is used to indicate a probability that a length of a time segment from a time point at which data enters the transmit unit to a time point at which the data leaves the transmit unit is not greater than a time length threshold.

Based on this, on one hand, in this embodiment of this application, the latency satisfaction degree is used to indicate the probability that the length of the time segment from the time point at which the data enters the transmit unit to the time point at which the data leaves the transmit unit is not greater than the time length threshold. Therefore, the latency satisfaction degree can be considered as a user experience indicator. To be specific, the latency satisfaction degree can better reflect user experience of a terminal device. In this way, whether to expand the capacity of the transmit unit is determined based on the latency satisfaction degree, and data service network planning can be better guided from a perspective of user experience of the terminal device, thereby providing a better service for a user. In addition, a channel is shared by users in a data service network. Therefore, a concept of a block probability in the prior art is not applicable. The block probability is defined as a probability that a system has no idle channel. In this way, whether to expand the capacity of the transmit unit can be determined more accurately based on a concept of the latency satisfaction degree.

In step 3101, the expansion device may monitor a service transmission process of the transmit unit in real time, and collect data characteristic information of each user in a sampling time segment. Optionally, the sampling time segment may be a predefined time segment. For example, a time segment of busy hours may be determined through observation and data statistics, and the time segment of busy hours is determined as the sampling time segment. Further, there are a plurality of manners of determining the time segment of busy hours. For example, a quantity of downlink data packets in a preset time segment may be counted, and a time segment in which a total quantity of bits of data packets that arrive in a period of time is greater than a bit quantity threshold is determined as the time segment of busy hours. In terms of the total quantity of bits of the data packets, both a quantity of the data packets and a length of a single data packet are considered. The time segment of busy hours that is determined based on the two dimensions can more accurately reflect a network load status. For another example, the time segment of busy hours may be determined according to experience. For example, if a coverage area of a transmit unit is a residential area, it may be determined, according to experience, that a user in the coverage area of the transmit unit should usually use a data service after work. Therefore, 18:00 to 20:00 at night may be set as the time segment of busy hours according to experience.

Optionally, if the capacity of the transmit unit needs to be expanded for a downlink service, the data packets collected in step 3101 may be downlink data packets. If the capacity of the transmit unit needs to be expanded for an uplink service, the data packets collected in step 3101 may be uplink data packets.

In step 3101, optionally, the preset time segment may be a transmission time interval (TTI), and data characteristic information in the coverage area of the transmit unit in a plurality of TTIs may be collected in the sampling time segment. To be specific, a quantity of data packets corresponding to each user in each TTI and lengths of the data packets are collected. Further, particular processing may be performed on collected data, and then the collected data is fitted by using a power-law model. For example, an average value of quantities of arrived data packets corresponding to users in each TTI and an average value of lengths of the arrived data packets corresponding to the users in each TTI are calculated.

For example, data in two TTIs is collected. Data characteristic information of a user $w_1$ and a user $w_2$ is collected in a first TTI. The user $w_1$ corresponds to two data packets, and data lengths of the two data packets are $w_3$ and $w_4$. The user $w_2$ corresponds to one data packet, and a data length of the data packets is $w_5$. Data characteristic information of a user $w_6$ and a user $w_7$ is collected in a second TTI. The user $w_6$ corresponds to two data packets, and data lengths of the two data packets are $w_8$ and $w_9$. The user $w_7$ corresponds to two data packets, and data lengths of the two data packets are $w_{10}$ and $w_{11}$.

In the foregoing example, an average value of quantities of arrived data packets corresponding to the users in the first TTI is calculated based on [(the quantity 2 of data packets corresponding to the user $w_1$+the quantity 1 of data packets corresponding to the user $w_2$)/the quantity 2 of users in the first TTI]. The average value of the quantities of arrived data packets corresponding to the users in the first TTI is 3/2 after calculation. Similarly, an average value of quantities of arrived data packets corresponding to the users in the second TTI is a value of [(2+2)/2], that is, 4. A person skilled in the art may know that "/" in the calculation formulas represents a division sign.

In the foregoing example, an average value of lengths of the arrived data packets corresponding to the users in the first TTI is calculated based on [(the lengths $w_3+w_4$ of the data packets corresponding to the user $w_1$+the length $w_5$ of the data packet corresponding to the user $w_2$)/the quantity 2 of users in the first TTI]. The average value of the quantities of the arrived data packets corresponding to the users in the first TTI is [($w_3+w_4+w_5$)/2] after calculation. Similarly, an average value of lengths of the arrived data packets corresponding to the users in the second TTI is a value of [(($w_8+w_9+w_{10}+w_{11}$)/2].

In step 3102, in an optional implementation solution, the calculated average value of the quantities of arrived data packets corresponding to the users in each TTI and the calculated average value of the lengths of the arrived data packets corresponding to the users in each TTI in the foregoing example may be fitted by using the power-law model. In another optional implementation solution, reference values of the quantities of arrived data packets corresponding to the users in each TTI and reference values of the lengths of the data packets may also be fitted by using the power-law model. A reference value of a quantity of arrived data packets corresponding to a user in one TTI may be a quantity of data packets corresponding to the user that appears in the TTI, a quantity of data packets corresponding to a user that appears frequently in the TTI, a relatively large or small quantity of data packets corresponding to a user in the TTI, a weighted averaging value of quantities of data packets corresponding to several users, or the like. A reference value of a length of an arrived data packet corresponding to a user in one TTI may be a length of a data packet corresponding to a user that appears in the TTI, a length of a data packet corresponding to a user that appears frequently in the TTI, a relatively long or short length of a data packet corresponding to a user in the TTI, a weighted average value of lengths of data packets corresponding to several users, or the like.

In step 3102, there may be a plurality of power-law models. In an optional solution, the data characteristic information may be fitted by using a Poisson model distribution and a zeta model distribution. Alternatively, the data characteristic information may be fitted by using a Poisson model distribution and a Pareto model distribution. Alternatively, the data characteristic information may be fitted by using a zeta model distribution. Alternatively, the data characteristic information may be fitted by using a Pareto model distribution.

In an optional implementation solution provided in this embodiment of this application, the power-law model includes the zeta model and the Pareto model. To be specific, the data characteristic information is fitted based on the zeta model and the Pareto model by using a fitting method such as a least square method. Based on this, optionally, a distribution status of the quantity of data packets may be fitted by using the zeta model, to determine a zeta model parameter; a distribution status of the lengths of the data packets may be fitted by using the Pareto model, to determine a Pareto model parameter; and the user data transmission rate in the coverage area of the transmit unit is determined based on the zeta model parameter and the Pareto model parameter. For example, the average value of the quantities of arrived data packets corresponding to the users in each of the foregoing at least one TTI may be fitted by using the zeta model, to determine a zeta model parameter; and the average value of the lengths of the arrived data packets corresponding to the users in each of the foregoing at least one TTI may be fitted by using the Pareto model, to determine a Pareto model parameter.

Optionally, this embodiment of this application provides a formula of the zeta model, as shown in a formula (1):

$$Pr\{N(t) = y\} = \frac{(y+1)^{-\alpha}}{\varsigma(\alpha)} \qquad \text{Formula (1)}$$

In the formula (1), N(t) is a quantity of data packets arriving at the transmit unit in a $t^{th}$ preset time segment, Pr{N(t)=y} is a probability that the quantity of data packets arriving at the transmit unit in the $t^{th}$ preset time segment is y, y is a quantity of data packets and a value of a random variable, $\alpha$ is a shape parameter in the zeta model parameter, and $\xi(\bullet)$ is a Riemann zeta function.

Optionally, the quantity of data packets arriving at the transmit unit in the $t^{th}$ preset time segment may be an average value of quantities of data packets arriving at the transmit unit in the $t^{th}$ preset time segment in the foregoing content or a reference value of the quantity of data packets arriving at the transmit unit in the $t^{th}$ preset time segment.

Optionally, this embodiment of this application provides a formula of the Pareto model, as shown in a formula (2):

$$Pr\{L(m) < l\} = 1 - \left(\frac{l}{l_{min}}\right)^{-\beta} \qquad \text{Formula (2)}$$

In the formula (2), L(m) is a length of an $m^{th}$ data packet in the $t^{th}$ preset time segment, Pr{L(m)<l} is a probability that the length of the $m^{th}$ data packet is less than l, m is a length of a data packet and a value of a random variable, $\beta$ is a shape parameter in the Pareto model parameter, and $l_{min}$ is a length of a data packet that is collected in the at least one preset time segment and whose length is less than a length threshold. Optionally, l may be an average value of lengths of the data packets arriving at the transmit unit in the $t^{th}$ preset time segment, or l is a reference value of the lengths of the data packets arriving at the transmit unit in the $t^{th}$ preset time segment.

Optionally, the formula (1) and the formula (2) may have some variants. For example, a variant of the formula (2) is:

$$Pr\{L(m) < l\} = 1 - \left(\frac{l_{min}}{l}\right)^{\beta}.$$

Optionally, $l_{min}$ this embodiment of this application may be a length of a data packet that is collected in the at least one preset time segment and whose length is the shortest.

The user data transmission rate calculated in step 3102 may also be referred to as a single-user data transmission rate. In addition to the solutions provided in step 3101 and step 3102, there may be another method for calculating the single-user transmission rate. For example, a data regression method may be used to calculate the user data transmission rate. Specifically, for example, in a statistics collection period, an arrival rate corresponding to each user in each TTI is calculated; then an average value is calculated for arrival rates corresponding to users in each TTI, based on a quantity of users, to obtain an average rate corresponding to a single user in each TTI; and finally an average value is calculated for average rates corresponding to single users in all TTIs in the statistics collection period, based on a quantity of TTIs in the statistics collection period, to calculate a single-user data transmission rate in the statistics collection period.

This embodiment of this application provides another optional solution for determining the user data transmission rate. Specifically, the user data transmission rate in the coverage area of the transmit unit is determined according to a formula (3):

$$b = \frac{\zeta(\alpha)\beta l_{min}}{(\beta+1)^*\zeta(\alpha+1)} \quad \text{Formula (3)}$$

In the formula (3), b is the user data transmission rate, α is the shape parameter in the zeta model parameter, β is the shape parameter in the Pareto model parameter, $l_{min}$ is the length of the data packet that is collected in the at least one preset time segment and whose length is less than the length threshold, ξ(•) is the Riemann zeta function, and * is a multiplication sign.

The zeta model parameter and the Pareto model parameter in the formula (3) may be obtained according to the formula (1) and the formula (2).

Before step 3103, the expansion device may obtain the reference system transmission rate of the mobile communications system. There are a plurality of obtaining manners. For example, when the transmit unit is deployed, the reference system transmission rate is determined based on a system parameter. For another example, the reference system transmission rate is determined according to experience. For still another example, a distribution of system transmission rates is determined based on data analysis, and then an average value or a statistical median of these system transmission rates is used as the reference system transmission rate.

In an optional implementation of obtaining the reference system transmission rate of the mobile communications system, a quantity of equivalent channels is determined based on a physical layer transmission rate and a reference user data transmission rate that are supported by the mobile communications system; a preset capacity expansion calculation table is looked up based on the quantity of equivalent channels and the latency satisfaction degree, to obtain the quantity of reference users, where the capacity expansion calculation table includes an association relationship between the quantity of equivalent channel, the latency satisfaction degree, and the quantity of reference users under a condition that the reference user data transmission rate and preset latency duration are satisfied; and the reference system transmission rate of the mobile communications system when the latency satisfaction degree and the reference user data transmission rate are satisfied is calculated based on the quantity of reference users and the reference user data transmission rate. When the capacity expansion calculation table is looked up, the latency satisfaction degree may be input by a user, selected by a vendor for a user from a perspective of user experience, determined based on some empirical values, or the like. Because the capacity expansion calculation table may be set, a more accurate reference system transmission rate is determined based on the capacity expansion calculation table and the quantity of equivalent channels, thereby providing support for further determining whether to expand the capacity. In addition, the manner of looking up the capacity expansion calculation table can simplify the solution, so that a more complex function calculation process can be avoided, and a running speed of the solution can be further increased. Moreover, in this embodiment of this application, the capacity expansion calculation table is similar to an Erlang table (for example, an Erlang B table and/or an Erlang C table). Therefore, the capacity expansion calculation table can be more easily promoted.

In this embodiment of this application, the capacity expansion calculation table may be preset. For example, the transmit unit is a base station, data of the base station in different scenarios may be collected, capacity expansion calculation tables used in different scenarios are further established. Then, when the base station is deployed, a corresponding capacity expansion calculation table is selected based on a scenario in which the base station is located. The scenarios may be, for example, a city, countryside, an office area, and a residential area. For another example, when the base station is initially deployed, data characteristic information in a period of time may be collected, and a capacity expansion calculation table is established based on the data characteristic information. After the capacity expansion calculation table is used for a period of time, for example, half a year or one year, data characteristic information may be recollected. If the recollected data characteristic information is slightly different from the data characteristic information previously used to establish the capacity expansion calculation table, the table may not need to be updated, and capacity expansion may not need to be performed either. If the recollected data characteristic information is greatly different from the data characteristic information previously used to establish the capacity expansion calculation table, the capacity expansion calculation table needs to be re-updated based on the newly collected data characteristic information. Optionally, the capacity expansion calculation table may be updated each time the capacity of the transmit unit is expanded. Table 1 shows an example form of the capacity expansion calculation table provided in this embodiment of this application.

TABLE 1

Capacity expansion calculation table

| Equivalent channel | 1-latency satisfaction degree | | | | | |
|---|---|---|---|---|---|---|
| | 0.01 | 0.05 | 0.1 | 0.5 | 1 | 2 |
| ... | | | | | | |
| 3 | 0.0034 | 0.0035 | 0.0036 | 0.0043 | 0.0047 | 0.0102 |
| 4 | 0.0038 | 0.0036 | 0.0039 | 0.0053 | 0.0091 | 0.0249 |
| 5 | 0.0041 | 0.0046 | 0.0048 | 0.0096 | 0.0178 | 0.0471 |
| 6 | 0.0069 | 0.0072 | 0.0076 | 0.0111 | 0.0238 | 0.1434 |

As shown in Table 1, a row represents a value obtained by subtracting a latency satisfaction degree from 1. Optionally, a row in the capacity expansion calculation table may represent a latency satisfaction degree. A column represents an equivalent channel. 0.0034 in the third row and the second column in Table 1 is used as an example for description. For example, Table 1 is made under a condition that the reference user data transmission rate is 0.2 Mbps and the preset latency duration is 10 ms. In this case, when the latency satisfaction degree is (1−0.01%), and the equivalent channel is 3, it can be determined, by looking up the capacity expansion calculation table, that the quantity of reference users is 0.0034 when the reference user data transmission rate is 0.2 Mbps and the preset latency duration is 10 ms. Optionally, the reference user data transmission rate may also be referred to as a normalized user data transmission rate, and the quantity of reference users is referred to as a largest normalized system traffic volume.

In this embodiment of this application, there may be a plurality of optional implementations for establishing the capacity expansion calculation table. For example, the data characteristic information in the coverage area of the transmit unit is pre-collected, the data characteristic information is fitted by using the formula (1) and the formula (2), and a quantity of reference users in the capacity expansion calculation table is calculated according to a formula (4):

$$\eta = \int_0^D f(x)dx \qquad \text{Formula (4)}$$

In the formula (4), f(x) may satisfy a formula (5):

$$f(x) = \frac{B\left(1 - \frac{1}{\zeta(\alpha)}\right)}{B\tau - \frac{\beta^* l_{min} * \zeta(\alpha)}{(\beta+1)^* \zeta(\alpha+1)}} * \frac{l_{min}^\beta * \zeta(\alpha-1)}{\zeta(\alpha)} * \left(Rx - \frac{\zeta(\alpha-1)}{\zeta(\alpha)} + l_{min} + l_{min}\right) \qquad \text{Formula (5)}$$

In the formula (4) and the formula (5), $\eta$ is the latency satisfaction degree, D is the preset latency duration, $\eta$ is obtained by performing integral calculation on f(x), $\tau$ is the preset time segment, R is the reference system transmission rate of the mobile communications system when the latency satisfaction degree and the reference user data transmission rate are satisfied, B is the physical layer transmission rate supported by the mobile communications system, $\alpha$ is the shape parameter in the zeta model parameter, $\beta$ is the shape parameter in the Pareto model parameter, $l_{min}$ is the length of the data packet that is collected in the at least one preset time segment and whose length is less than the length threshold, * represents multiplication, and $\xi(\cdot)$ is the Riemann zeta function.

Optionally, in the formula (4) and the formula (5), when the latency satisfaction degree and the reference user data transmission rate are satisfied, the reference system transmission rate R of the mobile communications system satisfies a formula (6):

$$R = A * b_0 \qquad \text{Formula (6)}$$

In the formula (6), R is the reference system transmission rate of the mobile communications system when the latency satisfaction degree and the reference user data transmission rate are satisfied, A is the quantity of reference users, and $b_0$ is the reference user data transmission rate.

Optionally, in the formula (4) and the formula (5), the physical layer transmission rate B supported by the mobile communications system satisfies a formula (7):

$$B = n * b_0 \qquad \text{Formula (7)}$$

In the formula (7), B is the physical layer transmission rate supported by the mobile communications system, n is the quantity of equivalent channels, and $b_0$ is the reference user data transmission rate.

The capacity expansion calculation table can be constructed according to the formula (1) to the formula (7) based on the collected data characteristic information. When the capacity expansion calculation table is constructed, the preset latency duration and the reference user data transmission rate may be selected according to experience. For example, the reference user data transmission rate may be selected as a user data transmission rate that is determined based on collected data during construction of the capacity expansion calculation table, or may be some empirical values. For example, a user data transmission rate determined through statistics collection in a period of time is determined as the reference user data transmission rate. The selected preset latency duration may be consistent with preset latency duration in a standard Erlang table. For example, some common values such as 0.001, 0.01, and 0.05 may be selected.

Optionally, this embodiment of this application further provides a solution for constructing a capacity expansion calculation table. For example, the data characteristic information in the coverage area of the transmit unit is pre-collected. Optionally, particular processing is performed on the data characteristic information. For example, as described above, the average value of the quantities of the arrived data packets corresponding to the users in each TTI is calculated, or the reference values of the quantities of the arrived data packets corresponding to the users in each TTI are determined; and the average value of the lengths of the arrived data packets corresponding to the users in each TTI is calculated, or the reference values of the lengths of the arrived data packets corresponding to the users in each TTI are determined. Then, the calculated average value of the quantities of the arrived data packets corresponding to the users in each TTI and the calculated average value of the lengths of the arrived data packets corresponding to the users in each TTI are fitted by using a power-law model. Alternatively, in another optional implementation solution, the reference values of the quantities of the arrived data packets corresponding to the users in each TTI and the reference values of the lengths of the data packets may be fitted by using a power-law model. For example, the fitting may be performed by using an $\alpha$-stable distribution.

The $\alpha$-stable distribution is a distribution type that is quite widely used. A plurality of existing distributions, for example, an exponential distribution, a normal distribution, a Cauchy distribution, a Poisson distribution, a Levy distribution, a Pareto distribution, a zeta distribution, a Zipf distribution, and a Zipf-Mandelbrot distribution, may also be referred to as models in this embodiment. For example, the Cauchy distribution may also be referred to as a Cauchy model.

In an optional implementation solution, when the fitting is performed by using the $\alpha$-stable distribution, the data characteristic information may be fitted by using at least one of $\alpha$-stable distributions. For example, the data characteristic information may be fitted by using the Cauchy distribution. For another example, the data characteristic information may be fitted by using at least one power-law function. For example, the data characteristic information is fitted by using the Zipf distribution and the Poisson distribution. Optionally, when the fitting is performed by using the $\alpha$-stable distribution, the reference system transmission rate of the mobile communications system needs to be given in advance. The fitting is performed by using the $\alpha$-stable distribution based on the given reference system transmission rate and the collected data characteristic information. After a model parameter corresponding to the $\alpha$-stable distribution is obtained, a Laplace value inverse transformation method may be further used to obtain a value of f(x) based on the given reference system transmission rate. The latency satisfaction degree can be determined by performing integral calculation on f(x). The capacity expansion calculation table can be constructed based on the given reference system transmission rate and the calculated latency satisfaction degree.

This embodiment of this application provides a model formula corresponding to the α-stable distribution. α-stable may also be written as alpha-stable in English, and a characteristic function corresponding to the α-stable distribution may be shown as a formula (8):

$$\varphi(s;\gamma,\chi,c,\mu)=\exp(is\mu-|cs|^\gamma(1-i\chi\text{sgn}(s)\Phi)) \quad \text{Formula (8)}$$

In the formula (8), s is a variable of the characteristic function relative to a complex number, and may represent a characteristic of a probability distribution in frequency domain;

γ is a stability parameter;

χ is an inclination parameter and ranges from −1 to 1;

c is a scaling factor;

μ is a location parameter;

i is a complex number unit;

exp(•) is an exponential function;

|•| is an absolute value;

sgn(•) is a sign function;

φ(s;γ,χ,c,μ) represents the characteristic function corresponding to the α-stable distribution;

Φ is a variable parameter; and optionally, in the formula (8), $$\Phi = \begin{cases} \tan(\frac{\pi\gamma}{2}); \gamma \neq 1 \\ -\frac{2}{\pi}\log|s|; \gamma = 1 \end{cases},$$

where tan is a tangent function, log is a logarithmic function, and π is a constant.

In this embodiment of this application, in another optional embodiment, step 3102 may be performed by using a solution corresponding to the formula (8). For example, the data characteristic information is fitted by using the model formula corresponding to the α-stable distribution, to obtain the model parameter corresponding to the α-stable distribution. The user data transmission rate in the coverage area of the transmit unit is further obtained based on the model parameter corresponding to the α-stable distribution.

In step 3103, in an optional implementation, the theoretical quantity of users supported by the mobile communications system when the latency satisfaction degree is satisfied may be determined according to a formula (9):

$$K = \left\lfloor \frac{Ab_0}{b} \right\rfloor \quad \text{Formula (9)}$$

In the formula (9), K is the theoretical quantity of users, b is the user data transmission rate, A is the quantity of reference users, $b_0$ is the reference user data transmission rate, and ⌊•⌋ represents rounding down. Optionally, the theoretical quantity K of users may be alternatively determined in another manner. For example, rounding off or rounding up is performed on a value of $$\frac{Ab_0}{b}$$

in the formula (9), or rounding up is performed on a value of $$\frac{Ab_0}{b}$$

in the formula (9) and then 1 is subtracted.

For example, with reference to Table 1, when it is found, by looking up Table 1, that the quantity of equivalent channels is 6, and the latency satisfaction degree is required to be 98%, a reference user rate is 0.1434. In this case, when the preset latency duration is satisfied, the reference system transmission rate is (0.1434*the reference user data transmission rate=0.1434*0.2 Mbps=0.02868 Mbps). If the user data transmission rate is 10 Kbps, the theoretical quantity of users may be calculated to be $$\left\lfloor \frac{0.0286 Mbps}{10 Kbps} \right\rfloor = 2$$

according to the formula (9).

Optionally, in step 3104, the expansion device determines, based on the theoretical quantity of users and the actual quantity of users that access the transmit unit in the preset time segment, whether to expand the capacity of the transmit unit. The actual quantity of users that access the transmit unit in the preset time segment may be an average value of collected quantities of users in all preset time segments in step 3101. To be specific, the average value is obtained by dividing a total collected quantity of users in the at least one preset time segment by a quantity of preset time segments. For example, the at least one preset time segment corresponds to five TTIs, and a total collected quantity of users in the at least one preset time segment is 1,000,000. In this case, the actual quantity of users that access the transmit unit in the preset time segment may be obtained based on (1,000,000/5). In another optional implementation, a collected quantity of users in each of all preset time segments in the at least one preset time segment is determined, and the actual quantity of users that access the transmit unit in the preset time segment may be a statistical median of collected quantities of users in all the preset time segments, may be a collected quantity of users in one of all the preset time segments, or may be a value obtained after weighted averaging is performed on collected quantities of users in a plurality of preset time segments in all the preset time segments.

Optionally, if the transmit unit is a base station, and the theoretical quantity of users is less than the actual quantity of users that access the transmit unit in the preset time segment, a capacity of the base station may be expanded. Further, optionally, capacity expansion may be performed when a difference between the actual quantity of users that access the transmit unit in the preset time segment and the theoretical quantity of users is greater than a difference threshold.

Optionally, if the transmit unit is a base station, and the theoretical quantity of users is not less than the actual quantity of users that access the transmit unit in the preset time segment, a capacity of the base station may not be expanded. Further, optionally, capacity expansion may not be performed when a difference between the actual quantity of users that access the transmit unit in the preset time segment and the theoretical quantity of users is not greater than a difference threshold.

Optionally, if the transmit unit is an RRU, the expansion device may be a BBU module. In this case, in step 3104, optionally, if the theoretical quantity of users is greater than the actual quantity of users, the baseband processing unit BBU module increases physical resource block PRB resources by a first quantity for the RRU. Optionally, if the theoretical quantity of users is less than the actual quantity of users, the baseband processing unit BBU module decreases PRB resources by a second quantity for the RRU.

Further, optionally, the first quantity is determined according to a formula (10):

$$\text{First quantity} = \frac{(N-K)*b}{\rho} \quad \text{Formula (10)}$$

In the formula (10), K is the theoretical quantity of users, N is the actual quantity of users, b is the user data transmission rate, $\rho$ is a transmission rate on a PRB resource, and * represents multiplication.

Further, optionally, the second quantity is determined according to a formula (10):

$$\text{Second quantity} = \frac{(K-N)*b}{\rho} \quad \text{Formula (11)}$$

In the formula (11), K is the theoretical quantity of users, N is the actual quantity of users, b is the user data transmission rate, $\rho$ is a transmission rate on a PRB resource, and * represents multiplication.

Figure 4:
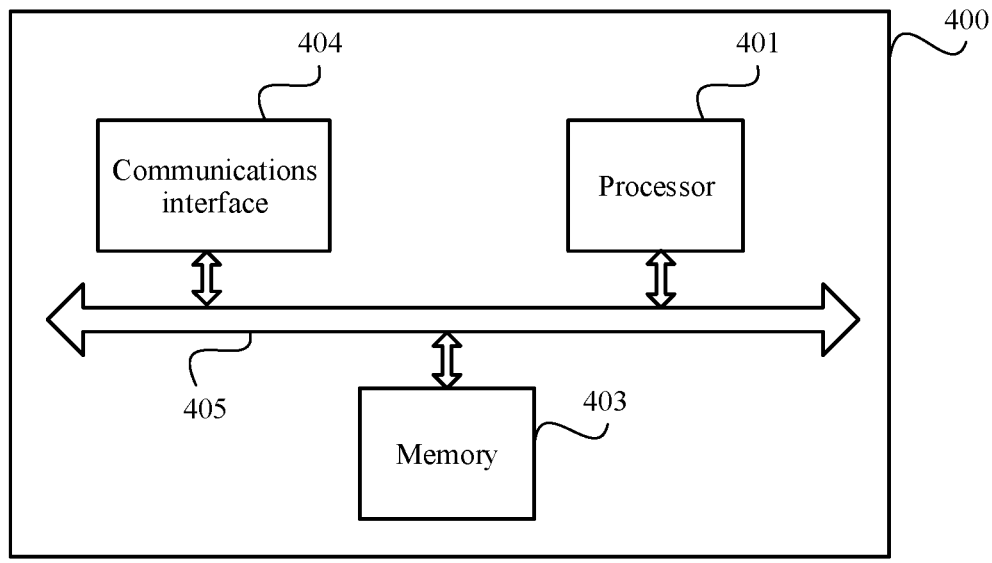
FIG. 4 is a schematic structural diagram of a mobile communications system expansion device according to an embodiment of this application.

Based on a same concept, an embodiment of this application provides a mobile communications system expansion device, configured to perform any solution in the foregoing method. FIG. 4 is an example schematic structural diagram of a mobile communications system expansion device according to an embodiment of this application. As shown in FIG. 4, optionally, when a transmit unit in this embodiment of this application is a base station 1102 in FIG. 1, the expansion device 400 may be alternatively deployed on the base station 1102. Optionally, when a transmit unit in this embodiment of this application is the RRU 1202 in FIG. 2, the expansion device 400 may be a BBU module. The expansion device 400 may be the BBU resource pool 1207 or a module deployed in the BBU resource pool 1207. For example, the expansion device 400 may be a module including the PHY/MAC processing unit 1205 and the general-purpose processing unit 1206. Optionally, the expansion device 400 includes a processor 401, a memory 403, and a communications interface 404. The processor 401, the memory 403, and the communications interface 404 are connected to each other by using a bus 405.

The bus 405 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 4, but this does not mean that there is only one bus or only one type of bus.

The memory 403 may include a volatile memory, for example, a random access memory (RAM). Alternatively, the memory may include a non-volatile memory, for example, a flash memory, a hard disk drive (HDD), or a solid state drive (SSD). Alternatively, the memory 403 may include a combination of the foregoing types of memories.

The communications interface 404 may be a wired communications access interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 401 may be a central processing unit (CPU), a network processor (NP), or a combination of the CPU and the NP. The processor 401 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the memory 403 may be further configured to store a program instruction. The processor 401 can perform one or more steps or optional implementations in the embodiment illustrated in the foregoing solution by invoking the program instruction stored in the memory 403, so that the expansion device 400 implements functions of the expansion device in the foregoing method.

The processor 401 is configured to execute an instruction stored in the memory. When the processor 401 executes the instruction stored in the memory, the expansion device 400 is configured to: collect data characteristic information in a coverage area of the transmit unit in at least one preset time segment, where the data characteristic information includes a quantity of data packets and lengths of the data packets; fit a distribution status of the data characteristic information by using a power-law model, to obtain a user data transmission rate in the coverage area of the transmit unit; determine, based on the user data transmission rate and an obtained reference system transmission rate of a mobile communications system, a theoretical quantity of users supported by the mobile communications system; and determine, based on the theoretical quantity of users and an actual quantity of users that access the transmit unit in the preset time segment, whether to expand a capacity of the transmit unit. In this embodiment of this application, a latency satisfaction degree is used to indicate a probability that a length of a time segment from a time point at which data enters the transmit unit to a time point at which the data leaves the transmit unit is not greater than a time length threshold. Therefore, the latency satisfaction degree can be considered as a user experience indicator. To be specific, the latency satisfaction degree can better reflect user experience of a terminal device. In this way, whether to expand the capacity of the transmit unit is determined based on the latency satisfaction degree, and data service network planning can be better guided from a perspective of user experience of the terminal device, thereby providing a better service for a user.

In a possible design, the processor is further configured to: obtain the to-be-satisfied latency satisfaction degree, where the latency satisfaction degree is used to indicate the probability that the length of the time segment from the time point at which the data enters the transmit unit to the time point at which the data leaves the transmit unit is not greater than the time length threshold; and determine, based on a quantity of reference users and a reference user data transmission rate that are supported by the mobile communications system and the latency satisfaction degree, the reference system transmission rate of the mobile communications system when the latency satisfaction degree and the reference user data transmission rate are satisfied.

In a possible design, the power-law model includes a zeta model and a Pareto model; and the processor is configured to: fit a distribution status of the quantity of data packets by using the zeta model, to determine a zeta model parameter; fit a distribution status of the lengths of the data packets by using the Pareto model, to determine a Pareto model parameter; and determine the user data transmission rate in the coverage area of the transmit unit based on the zeta model parameter and the Pareto model parameter.

Optionally, for a formula of the zeta model and a formula of the Pareto model, refer to the foregoing content. Details are not described herein again. Optionally, for details of determining the user data transmission rate in the coverage area of the transmit unit, refer to the foregoing content.

In a possible design, the processor is configured to: determine a quantity of equivalent channels based on a physical layer transmission rate and the reference user data transmission rate that are supported by the mobile communications system; look up a preset capacity expansion calculation table based on the quantity of equivalent channels and the latency satisfaction degree, to obtain the quantity of reference users, where the capacity expansion calculation table includes an association relationship between the quantity of equivalent channel, the latency satisfaction degree, and the quantity of reference users under a condition that the reference user data transmission rate and preset latency duration are satisfied; and calculate, based on the quantity of reference users and the reference user data transmission rate, the reference system transmission rate of the mobile communications system when the latency satisfaction degree and the reference user data transmission rate are satisfied.

Optionally, for details about the theoretical quantity of users and a method for constructing the capacity expansion calculation table, refer to the foregoing content.

In a possible design, the transmit unit is a remote radio unit (RRU), and the processor is configured on a baseband processing unit (BBU) module. The processor is configured to: if the theoretical quantity of users is greater than the actual quantity of users, increase physical resource block (PRB) resources by a first quantity for the RRU; and/or if the theoretical quantity of users is less than the actual quantity of users, decrease PRB resources by a second quantity for the RRU.

Figure 5:
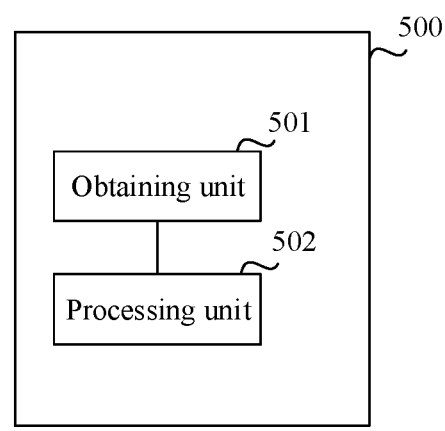
FIG. 5 is a schematic structural diagram of a mobile communications system expansion device according to an embodiment of this application.

Based on a same concept, an embodiment of this application provides a mobile communications system expansion device, configured to perform any solution in the foregoing method. FIG. 5 is an example schematic structural diagram of a mobile communications system expansion device according to an embodiment of this application. As shown in FIG. 5, optionally, when a transmit unit in this embodiment of this application is a base station 1102 in FIG. 1, the expansion device 500 may be alternatively deployed on the base station 1102. Optionally, when a transmit unit in this embodiment of this application is the RRU 1202 in FIG. 2, the expansion device 500 may be a BBU module. The expansion device 500 may be the BBU resource pool 1207 or a module deployed in the BBU resource pool 1207. For example, the expansion device 500 may be a module including the PHY/MAC processing unit 1205 and the general-purpose processing unit 1206.

Optionally, the expansion device 500 includes an obtaining unit 501 and a processing unit 502. The obtaining unit 501 is configured to collect data characteristic information in a coverage area of the transmit unit in at least one preset time segment, where the data characteristic information includes a quantity of data packets and lengths of the data packets. The processing unit 502 is configured to: fit a distribution status of the data characteristic information by using a power-law model, to obtain a user data transmission rate in the coverage area of the transmit unit; determine, based on the user data transmission rate and an obtained reference system transmission rate of a mobile communications system, a theoretical quantity of users supported by the mobile communications system; and determine, based on the theoretical quantity of users and an actual quantity of users that access the transmit unit in the preset time segment, whether to expand a capacity of the transmit unit. Optionally, the processing unit 502 may further perform another method performed by the expansion device, and may further perform another method performed by the processor 401 in FIG. 4. Details are not described herein.

Optionally, in this embodiment of this application, if the solution provided in the embodiment of this application needs to be implemented for a downlink service, both the obtaining unit 501 and the processing unit 502 may be deployed on a base station 1102 in FIG. 1. Optionally, the obtaining unit may be connected to a downlink data pipeline, and the obtaining unit may directly collect downlink data characteristic information.

Optionally, in this embodiment of this application, if the solution provided in the embodiment of this application needs to be implemented for an uplink service, a collection unit may be deployed on a terminal device of a user, and configured to collect uplink data characteristic information. The obtaining unit 501 obtains the collected uplink data characteristic information from the collection unit. Alternatively, the obtaining unit is connected to an uplink data pipeline, and directly collects the uplink data characteristic information. Further, the processing unit 502 subsequently processes the data characteristic information. Optionally, the obtaining unit 501 and the processing unit 502 may be deployed on a base station 1102 in FIG. 1 or in the BBU resource pool 1207 in FIG. 2.

Further, optionally, in a virtual unit division method in an embodiment of this application, the method performed in step 3102 in FIG. 3 is performed by the processing unit 502. In another optional implementation, in step 3102, the distribution status of the data characteristic information may be alternatively fitted by using the power-law model, to obtain a model parameter, and the obtaining unit 501 processes the model parameter. Then, the processing unit 502 further obtains the data transmission rate based on the model parameter.

It should be understood that division of all the units is merely logical function division. In actual implementation, all or some of the units may be integrated into one physical device, or may be physically separate. In this embodiment of this application, the obtaining unit 501 and the processing unit 502 may be implemented by the processor 401. As shown in FIG. 4, the expansion device 400 may include the processor 401 and the memory 403. The memory 403 may be configured to store code used by the processor 401 to perform the solution. The code may be a program/code pre-installed before delivery of the expansion device 400.

All or some of the foregoing embodiments may be implemented by using software, hardware, firmware, or any combination thereof. When a software program is used for implementation, all or some of the embodiments may be implemented in a form of a computer program product. The computer program product includes one or more instructions. When the computer program instructions are loaded and executed on a computer, all or some of the procedures or functions according to the embodiments of this application are generated. The computer may be a general-purpose computer, a dedicated computer, a computer network, or another programmable apparatus. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium that can be accessed by a computer, or a data storage device, such as a server or a data center, integrating one or more usable media. The usable medium may be a magnetic medium (for example, a floppy disk, a hard disk, a magnetic tape, or a magneto-optical disk (MO)), an optical medium (for example, a CD, a DVD, a BD, or an HVD), a semiconductor medium (for example, a ROM, an EPROM, an EEPROM, a non-volatile memory (NAND FLASH), or a solid state disk (SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk storage, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specified function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These instructions may be loaded onto the computer or the another programmable data processing device, so that the computer or the another programmable device performs a series of operations and steps, to generate computer-implemented processing. Therefore, the instructions executed on the computer or the another programmable device provide steps for implementing a specified function in one or more processes in the flowcharts and/or in one or more blocks in the block diagrams.

Apparently, a person skilled in the art can make various modifications and variations to the embodiments of this application without departing from the spirit and scope of this application. This application is intended to cover these modifications and variations to the embodiments of this application, provided that these modifications and variations fall within the scope defined in the claims of this application and equivalent technologies thereof

What is claimed is:

1. A mobile communications system expansion method, applied to a mobile communications system expansion device, the method comprising:
    collecting, by a processor of the mobile communications system expansion device, data characteristic information in a coverage area of a transmit unit in at least one preset time segment, wherein the data characteristic information comprises a quantity of data packets and lengths of the data packets;
    fitting, by the processor, a distribution status of the data characteristic information using a power-law model, to obtain a user data transmission rate in the coverage area of the transmit unit;
    determining, by the processor, based on the user data transmission rate and an obtained reference system transmission rate of a mobile communications system, a theoretical quantity of users supported by the mobile communications system; and
    determining, by the processor, based on the theoretical quantity of users and an actual quantity of users that access the transmit unit in the at least one preset time segment, whether to expand a capacity of the transmit unit.

2. The method according to claim 1, wherein before the determining the theoretical quantity of users supported by the mobile communications system, the method further comprises:
    obtaining, by the processor, a to-be-satisfied latency satisfaction degree, wherein the latency satisfaction degree indicates a probability that a length of a time segment from a time point at which data enters the transmit unit to a time point at which the data leaves the transmit unit is not greater than a time length threshold; and
    determining, by the processor, based on a quantity of reference users and a reference user data transmission rate that are supported by the mobile communications system and the latency satisfaction degree, the reference system transmission rate of the mobile communications system in response to that the latency satisfaction degree and the reference user data transmission rate are satisfied.

3. The method according to claim 1, wherein the power-law model comprises a zeta model and a Pareto model; and
    wherein the fitting the distribution status of the data characteristic information using a power-law model further comprises:
    fitting a distribution status of the quantity of data packets by using the zeta model, to determine a zeta model parameter;
    fitting a distribution status of the lengths of the data packets by using the Pareto model, to determine a Pareto model parameter; and
    determining the user data transmission rate in the coverage area of the transmit unit based on the zeta model parameter and the Pareto model parameter.

4. The method according to claim 3, wherein the zeta model is obtained according to the following:

$$Pr\{N(t) = y\} = \frac{(y+1)^{-\alpha}}{\varsigma(\alpha)},$$

wherein
- N(t) is a quantity of data packets arriving at the transmit unit in a $t^{th}$ preset time segment;
- Pr{N(t)=y} is a probability that the quantity of data packets arriving at the transmit unit in the $t^{th}$ preset time segment is y; and
- y is a value of a random variable, $\alpha$ is a shape parameter in the zeta model parameter, and $\xi(\bullet)$ is a Riemann zeta function.

5. The method according to claim 4, wherein the Pareto model is obtained according to the following:

$$Pr\{L(m) < l\} = 1 - \left(\frac{l}{l_{min}}\right)^{-\beta},$$

wherein
- L(m) is a length of an $m^{th}$ data packet in the $t^{th}$ preset time segment;
- Pr{L(m)<l} is a probability that the length of the $m^{th}$ data packet is less than l;
- l is an average value of lengths of the data packets arriving at the transmit unit in the $t^{th}$ preset time segment; and
- m is a value of a random variable, $\beta$ is a shape parameter in the Pareto model parameter, and $l_{min}$ is a length of a data packet that is collected in the at least one preset time segment and whose length is less than a length threshold.

6. The method according to claim 3, wherein the user data transmission rate in the coverage area of the transmit unit is determined according to the following:

$$b = \frac{\zeta(\alpha) * \beta * l_{min}}{(\beta+1) * \zeta(\alpha+1)},$$

wherein
wherein b is the user data transmission rate, $\alpha$ is the shape parameter in the zeta model parameter, $\beta$ is the shape parameter in the Pareto model parameter, $l_{min}$ is the length of the data packet that is collected in the at least one preset time segment and whose length is less than the length threshold, $\xi(\bullet)$ is the Riemann zeta function, and * is a multiplication sign.

7. The method according to claim 2, wherein the determining the reference system transmission rate of the mobile communications system in response to the latency satisfaction degree and the reference user data transmission rate are satisfied further comprises:
- determining a quantity of equivalent channels based on a physical layer transmission rate and the reference user data transmission rate that are supported by the mobile communications system;
- looking up a preset capacity expansion calculation table based on the quantity of equivalent channels and the latency satisfaction degree, to obtain the quantity of reference users, wherein the capacity expansion calculation table comprises an association relationship among the quantity of equivalent channel, the latency satisfaction degree, and the quantity of reference users under a condition that the reference user data transmission rate and preset latency duration are satisfied; and
- determining, based on the quantity of reference users and the reference user data transmission rate, the reference system transmission rate of the mobile communications system in response to that the latency satisfaction degree and the reference user data transmission rate are satisfied.

8. The method according to claim 7, wherein the theoretical quantity of users supported by the mobile communications system in response to that the latency satisfaction degree is satisfied is determined according to the following:

$$K = \left\lfloor \frac{Ab_0}{b} \right\rfloor,$$

wherein
- K is the theoretical quantity of users, b is the user data transmission rate, A is the quantity of reference users, $b_0$ is the reference user data transmission rate, and $\lfloor \bullet \rfloor$ represents rounding down.

9. The method according to claim 7, wherein the latency satisfaction degree in the capacity expansion calculation table satisfies the following:

$\eta = \int_0^D f(x)dx$, wherein $\eta$ is the latency satisfaction degree, D is the preset latency duration, and $$f(x) = \frac{B\left(1 - \frac{1}{\zeta(\alpha)}\right)}{B\tau - \frac{\beta * l_{min} * \zeta(\alpha)}{(\beta+1)*\zeta(\alpha+1)}} * \frac{l_{min}^\beta * \zeta(\alpha-1)}{\zeta(\alpha)} * \left(Rx - \frac{\zeta(\alpha-1)}{\zeta(\alpha)} l_{min} + l_{min}\right),$$

wherein
- $\tau$ is the preset time segment,
- R is the reference system transmission rate of the mobile communications system in response to that the latency satisfaction degree and the reference user data transmission rate are satisfied, $R = A*b_0$, A is the quantity of reference users, $b_0$ is the reference user data transmission rate,
- B is the physical layer transmission rate supported by the mobile communications system, $\alpha$ is the shape parameter in the zeta model parameter, $\beta$ is the shape parameter in the Pareto model parameter, $l_{min}$ is the length of the data packet that is collected in the at least one preset time segment and whose length is less than the length threshold, * represents multiplication, and $\xi(\bullet)$ is the Riemann zeta function.

10. The method according to claim 1, wherein the transmit unit is a remote radio unit (RRU); and
wherein the determining, based on the theoretical quantity of users and an actual quantity of users that access the transmit unit in the preset time segment, whether to expand a capacity of the transmit unit comprises:
- in response to that the theoretical quantity of users is greater than the actual quantity of users, increasing, by a baseband processing unit (BBU) module, physical resource block (PRB) resources by a first quantity for the RRU; and
- in response to that the theoretical quantity of users is less than the actual quantity of users, decreasing, by the BBU module, PRB resources by a second quantity for the RRU.

11. The method according to claim 10, wherein the first quantity or the second quantity is determined according to the following:

$$\frac{(N-K)*b}{\rho},$$

and $$\frac{(N-K)*b}{\rho},$$

wherein
K is the theoretical quantity of users, N is the actual quantity of users, b is the user data transmission rate, ρ is a transmission rate on a PRB resource, and * represents multiplication.

12. A mobile communications system expansion device comprising a processor and a memory, wherein
the memory is configured to store an instruction; and
the processor is configured to execute the instruction stored in the memory to cause the expansion device to:
collect data characteristic information in a coverage area of a transmit unit in at least one preset time segment, wherein the data characteristic information comprises a quantity of data packets and lengths of the data packets;
fit a distribution status of the data characteristic information using a power-law model, to obtain a user data transmission rate in the coverage area of the transmit unit; determine, based on the user data transmission rate and an obtained reference system transmission rate of a mobile communications system, a theoretical quantity of users supported by the mobile communications system; and determine, based on the theoretical quantity of users and an actual quantity of users that access the transmit unit in the preset time segment, whether to expand a capacity of the transmit unit.

13. The expansion device according to claim 12, wherein the processor is further configured to:
obtain a to-be-satisfied latency satisfaction degree, wherein the latency satisfaction degree indicates a probability that a length of a time segment from a time point at which data enters the transmit unit to a time point at which the data leaves the transmit unit is not greater than a time length threshold; and
determine, based on a quantity of reference users and a reference user data transmission rate that are supported by the mobile communications system and the latency satisfaction degree, the reference system transmission rate of the mobile communications system in response to that the latency satisfaction degree and the reference user data transmission rate are satisfied.

14. The expansion device according to claim 12, wherein the power-law model comprises a zeta model and a Pareto model; and
the processor is configured to:
fit a distribution status of the quantity of data packets using the zeta model, to determine a zeta model parameter;
fit a distribution status of the lengths of the data packets using the Pareto model, to determine a Pareto model parameter; and
determine the user data transmission rate in the coverage area of the transmit unit based on the zeta model parameter and the Pareto model parameter.

15. The expansion device according to claim 14, wherein the zeta model is obtained according to the following:

$$Pr\{N(t) = y\} = \frac{(y+1)^{-\alpha}}{\varsigma(\alpha)},$$

wherein
N(t) is a quantity of data packets arriving at the transmit unit in a $t^{th}$ preset time segment;
Pr{N(t)=y} is a probability that the quantity of data packets arriving at the transmit unit in the $t^{th}$ preset time segment is y; and
y is a value of a random variable, a is a shape parameter in the zeta model parameter, and ξ(∩) is a Riemann zeta function.

16. The expansion device according to claim 15, wherein the Pareto model is obtained according to the following:

$$Pr\{L(m) < l\} = 1 - \left(\frac{l}{l_{min}}\right)^{-\beta},$$

wherein
L(m) is a length of an $m^{th}$ data packet in the $t^{th}$ preset time segment;
Pr{L(m)<l} is a probability that the length of the $m^{th}$ data packet is less than l;
l is an average value of lengths of the data packets arriving at the transmit unit in the $t^{th}$ preset time segment; and
m is a value of a random variable, β is a shape parameter in the Pareto model parameter, and $l_{min}$ is a length of a data packet that is collected in the at least one preset time segment and whose length is less than a length threshold.

17. The expansion device according to claim 14, wherein the processor is configured to determine the user data transmission rate in the coverage area of the transmit unit according to the following:

$$b = \frac{\zeta(\alpha) * \beta * l_{min}}{(\beta+1) * \zeta(\alpha+1)},$$

wherein
b is the user data transmission rate, α is the shape parameter in the zeta model parameter, β is the shape parameter in the Pareto model parameter, $l_{min}$ is the length of the data packet that is collected in the at least one preset time segment and whose length is less than the length threshold, ξ(•) is the Riemann zeta function, and * is a multiplication sign.

18. The expansion device according to claim 13, wherein the processor is configured to:
determine a quantity of equivalent channels based on a physical layer transmission rate and the reference user data transmission rate that are supported by the mobile communications system;
look up a preset capacity expansion calculation table based on the quantity of equivalent channels and the latency satisfaction degree, to obtain the quantity of reference users, wherein the capacity expansion calculation table comprises an association relationship among the quantity of equivalent channel, the latency satisfaction degree, and the quantity of reference users under a condition that the reference user data transmission rate and preset latency duration are satisfied; and
determine, based on the quantity of reference users and the reference user data transmission rate, the reference system transmission rate of the mobile communications system in response to that the latency satisfaction degree and the reference user data transmission rate are satisfied.

19. The expansion device according to claim 18, wherein the processor is configured to determine, the theoretical quantity of users supported by the mobile communications system in response to that the latency satisfaction degree is satisfied, according to the following:

$$K = \left\lfloor \frac{Ab_0}{b} \right\rfloor,$$

wherein
K is the theoretical quantity of users, b is the user data transmission rate, A is the quantity of reference users, $b_0$ is the reference user data transmission rate, and $\lfloor \cdot \rfloor$ represents rounding down.

20. The expansion device according to claim 18, wherein the latency satisfaction degree in the capacity expansion calculation table satisfies the following:

$\eta = \int_0^D f(x)dx$, wherein

η is the latency satisfaction degree, D is the preset latency duration, and $$f(x) = \frac{B\left(1 - \frac{1}{\zeta(\alpha)}\right)}{B\tau - \frac{\beta * l_{min} * \zeta(\alpha)}{(\beta+1)*\zeta(\alpha+1)}} * \frac{l_{min}^\beta * \zeta(\alpha-1)}{\zeta(\alpha)} * \left(Rx - \frac{\zeta(\alpha-1)}{\zeta(\alpha)} l_{min} + l_{min}\right),$$

wherein
τ is the preset time segment,
R is the reference system transmission rate of the mobile communications system in response to that the latency satisfaction degree and the reference user data transmission rate are satisfied, $R = A * b_0$, A is the quantity of reference users, $b_0$ is the reference user data transmission rate,
B is the physical layer transmission rate supported by the mobile communications system, α is the shape parameter in the zeta model parameter, β is the shape parameter in the Pareto model parameter, $l_{min}$ is the length of the data packet that is collected in the at least one preset time segment and whose length is less than the length threshold, * represents multiplication, and ξ(•) is the Riemann zeta function.

* * * * *

UNITED STATES PATENT AND TRADEMARK OFFICE
CERTIFICATE OF CORRECTION

PATENT NO. : 10,887,774 B2  
APPLICATION NO. : 16/862104  
DATED : January 5, 2021  
INVENTOR(S) : Zhang et al.

Page 1 of 1

It is certified that error appears in the above-identified patent and that said Letters Patent is hereby corrected as shown below:

In the Claims

Claim 11: Column 25, Line 15: " $\frac{(N-K)*b}{\rho}$ ," should be deleted.

Claim 15: Column 26, Line 19: "in the zeta model parameter, and ξ(∩) is a Riemann" should read -- in the zeta model parameter, and $\zeta(\bullet)$ is a Riemann --.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*